United States Patent
Haxell et al.

(10) Patent No.: US 6,342,959 B1
(45) Date of Patent: Jan. 29, 2002

(54) TRANSIENT SUPPRESSION IN AN OPTICAL WAVELENGTH DIVISION MULTIPLEXED NETWORK

(75) Inventors: Ian Haxell, London; Dimitra Simeonidou, Purley, both of (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 08/936,689

(22) Filed: Sep. 24, 1997

(30) Foreign Application Priority Data

Oct. 18, 1996 (GB) .............................................. 9621746

(51) Int. Cl.$^7$ ................................................ H04J 14/02
(52) U.S. Cl. ....................... 359/124; 359/161; 359/187; 359/337
(58) Field of Search ................................ 359/161, 177, 359/124–125, 187, 337

(56) References Cited

U.S. PATENT DOCUMENTS

| | | | | |
|---|---|---|---|---|
| 5,383,046 A | * | 1/1995 | Tomofuji et al. | 359/176 |
| 5,532,864 A | * | 7/1996 | Alexander et al. | 359/177 |
| 5,561,119 A | * | 10/1996 | Jacquesy et al. | 455/609 |
| 5,739,933 A | * | 4/1998 | Dembeck et al. | 359/117 |
| 5,907,420 A | * | 5/1999 | Chraplyvy et al. | 359/179 |
| 5,923,462 A | * | 7/1999 | Haxell et al. | 359/341 |
| 6,091,535 A | * | 7/2000 | Satoh | 359/187 |

FOREIGN PATENT DOCUMENTS

| EP | 0 305 995 A2 | 3/1989 |
|---|---|---|
| EP | 0 792 035 A2 | 9/1997 |

OTHER PUBLICATIONS

Inoue, K., et al., "Tunable Gain Equalization Using a Mach–Zehnder Optical Filter in Multistage Fiber Amplifiers," *IEEE Photonics Technology Letters*, 3 (1991) August, No. 8, New York, US.

Srivastava, A., et al., "Fast Gain Control in an Erbium –Doped Fiber Amplifier", *osa tops On Optical Amplifiers and Their Applications*, 1996, vol. 5, 1996 OAA Program Committee (eds., 1996 Optical Society of America.

Srivastava, A., et al., "Fast–Link Control Protection of Surviving Channels in Multiwavelength Optical Networks," *IEEE Photonics Technology Letters*, vol. 9, No. 12, December 1997.

\* cited by examiner

*Primary Examiner*—Kinfe-Michael Negash
(74) *Attorney, Agent, or Firm*—Sughrue Mion, PLLC

(57) ABSTRACT

An optical level controller (13) for a wavelength division multiplex optical communication network (17) includes one or more variable gain elements (1;9) adapted to suppress transient amplitude fluctuations in traffic signals caused by the adding or the dropping of traffic signals at one more points in the optical communication network. The at least one variable gain element (1;9) is controlled through a negative feedback loop adapted such that a response time of the negative feedback is shorter than a time scale of the transient amplitude fluctuations.

10 Claims, 4 Drawing Sheets

TRANSIENT SUPPRESSION IN AN OPTICAL WAVELENGTH DIVISION MULTIPLEXED NETWORK

BACKGROUND OF THE INVENTION

This invention relates to the suppression of transients which can occur in conventional optical wavelength division multiplex (WDM) communication systems.

1. Field of the Invention

It has been shown in J. L. Zyskind et al, "Fast power transients in optically amplified multi-wavelength optical networks", Optical Fibre Communication conference, vol. 2, OSA Technical Digest Series, PD 31-1, San Jose, 1996, that power transients in chains of highly pumped, deeply saturated erbium doped fibre amplifiers were demonstrated to occur on time scales much faster than those for an individual amplifier. Such fast power transients constitute a major issue for optical networks in which channels are added and dropped either due to network reconfiguration or failures. The surviving channels will suffer error bursts if their powers exceed the dynamic range of the terminal receiver. Protection against such error bursts must be fast enough to limit the surviving channel power excursions.

2. Description of the Related Art

According to a first aspect of the present invention, an optical level controller for a wavelength division multiplexed optical communication network comprises one or more variable gain elements adapted to suppress transient amplitude fluctuations in traffic signals caused by the adding or the dropping of traffic signals at one or more points in the optical communication network, wherein the variable gain element is controlled through a negative feedback loop adapted such that a response time of the negative feedback loop is shorter than the time scale of the transient amplitude fluctuations.

In the present invention, a high speed variable gain element is provided to protect a network from fast power variations.

In one preferred embodiment, the variable gain element is a semiconductor laser amplifier in which the bias of the amplifier is controlled by the negative feed back loop.

In another preferred embodiment, the variable gain element is a Mach-Zehnder optical modulator in which the bias of the modulator is controlled by the negative feedback loop.

Preferably, the negative feedback loop comprises an optical coupler to split a portion of the output of the respective variable gain element onto the negative feedback loop, and a photodiode to detect the split portion of the variable gain element.

Preferably, the negative feedback loop comprises a low pass filter to provide a slowly varying dc voltage for control of the respective variable gain element.

According to a second aspect of the present invention, a wavelength division multiplexed optical communication network comprises a voltage level controller in accordance with the first aspect of the present invention.

The voltage level controller may be provided to condition signals entering a receiving station of the network or alternatively located at an optical cross-connect of the network.

BRIEF DESCRIPTION OF THE DRAWINGS

Examples of the present invention will now be described with reference to the accompanying drawings, in which.

DETAILED DESCRIPTION OF THE PREFFERRED EMBODIMENTS

Figure 1:
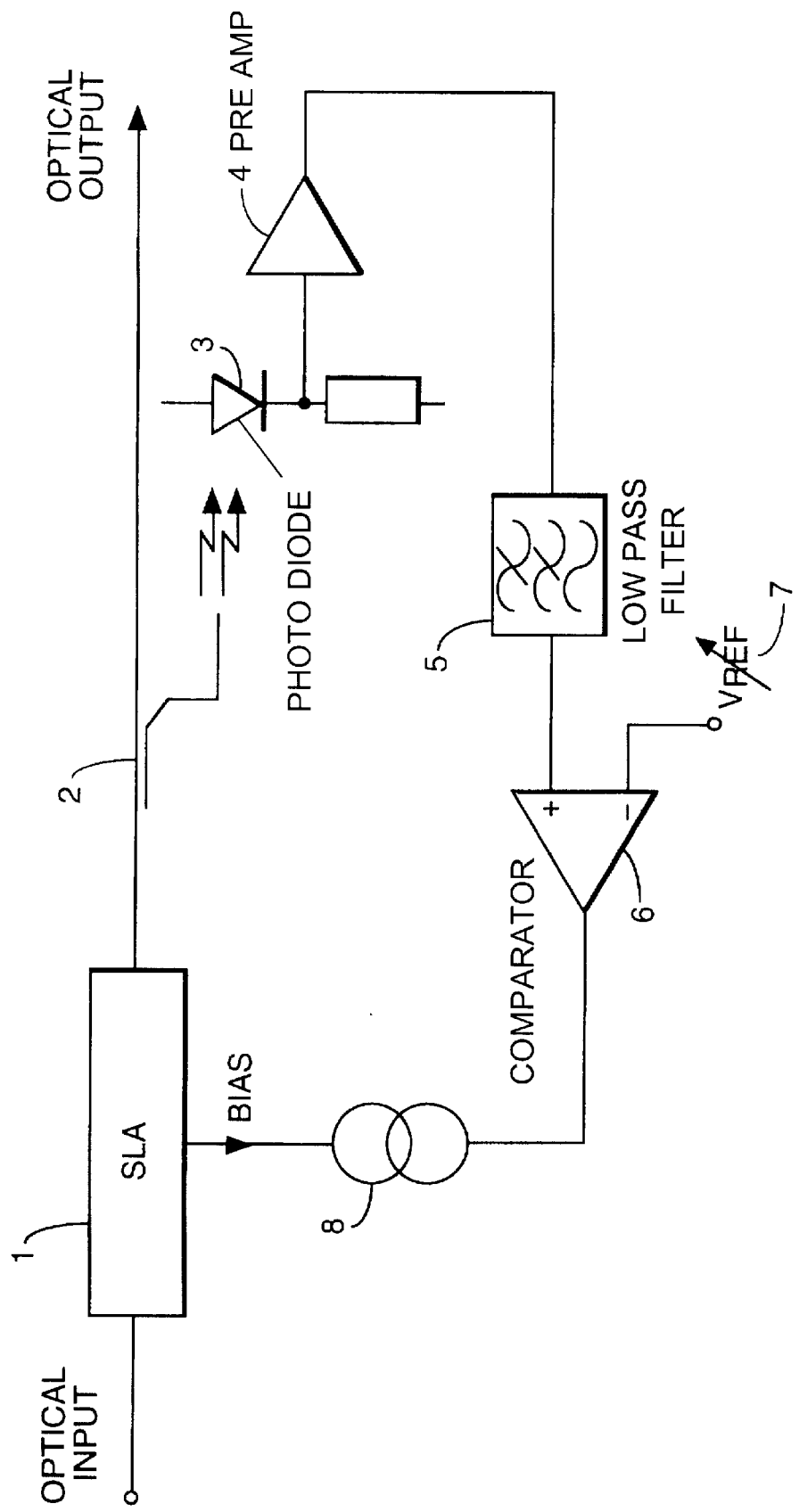
FIG. 1 shows a block diagram of a first example of an optical level controller in accordance with the present invention in which a semiconductor laser amplifier is provided as a variable gain element.

In FIG. 1, the optical power emerging from a semiconductor laser amplifier (SLA) 1 is monitored using a fibre coupler 2 and electrically detected with a photodiode 3. The signal is amplified by a preamplifier 4 and after conditioning by a low-pass filter 5 becomes effectively a dc voltage level which controls the bias to the SLA 1. An increase in dc voltage level around the operating point results in a decrease in bias current to the SLA, thus resulting in a negative feedback loop. A comparator 6 connected to a voltage reference source 7 in combination with a current source 8 provides optical output adjustment for the SLA 1.

The aforementioned electrical components in the feed back loop are constructed such that the closed loop response time is faster than the fastest transient that is desired to be suppressed. The SLA 1 is used as a variable gain element because of its relatively fast response time. This is limited by the carrier life-time in the device and will be in the order of hundreds of pico-seconds.

Figure 2:
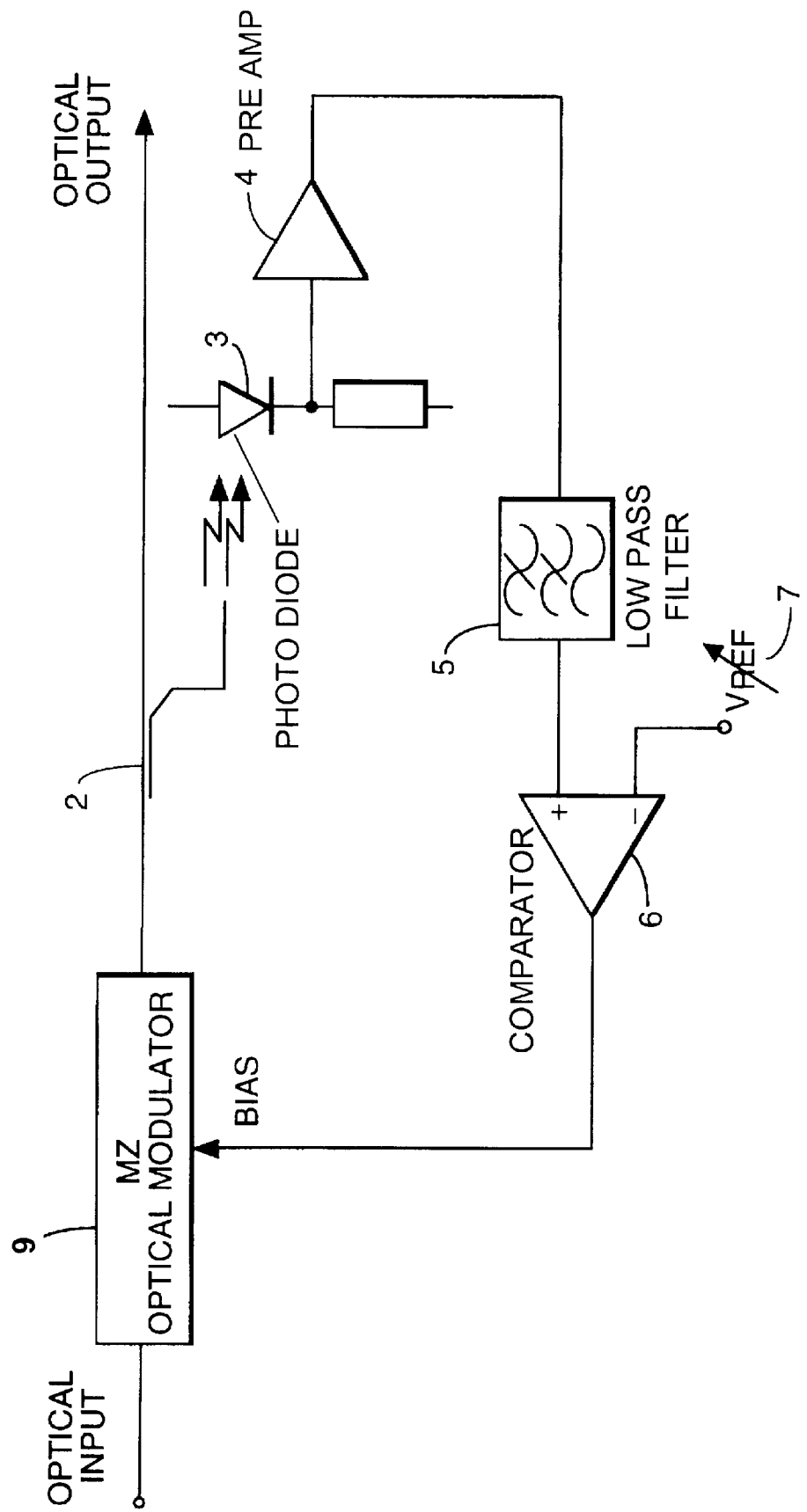
FIG. 2 shows a block diagram of a second example of an optical level controller in accordance with the present invention in which a Mach-Zehnder optical modulator is provided as a variable gain element.

In the example in FIG. 2, the optical power emerging from a Mach-Zehnder optical modulator 9 is monitored using a fibre coupler 2 and detected with a photodiode 3. The signal is preamplified and after low-pass filtering becomes effectively a dc voltage level which controls the dc bias voltage to the Mach-Zehnder optical modulator 9. An increase in dc voltage level responds to a decrease in the light level over the integration time of the low-pass filter 5, thus resulting in a negative feedback loop. Again, the electrical components are constructed such that the closed loop response time is faster than the transient that is desired to be suppressed, while being of sufficient length to be resilient to long strings of ones and zeros in the data stream i.e. so that the dc voltage level only varies slowly with time. Typically, this requires a time constant of the order of 50 bit periods or 10 nanoseconds for an STM 16 system. The Mach-Zehnder optical modulator 9 is used as the variable gain element because of its relatively fast response time. This is limited by the electrical drive response of the package and will be of the order of hundreds of pico-seconds.

One feature of a Mach-Zehnder modulator 9 is its polarisation sensitivity. As the received state of polarisation cannot be guaranteed this needs to be addressed.

Figure 3:
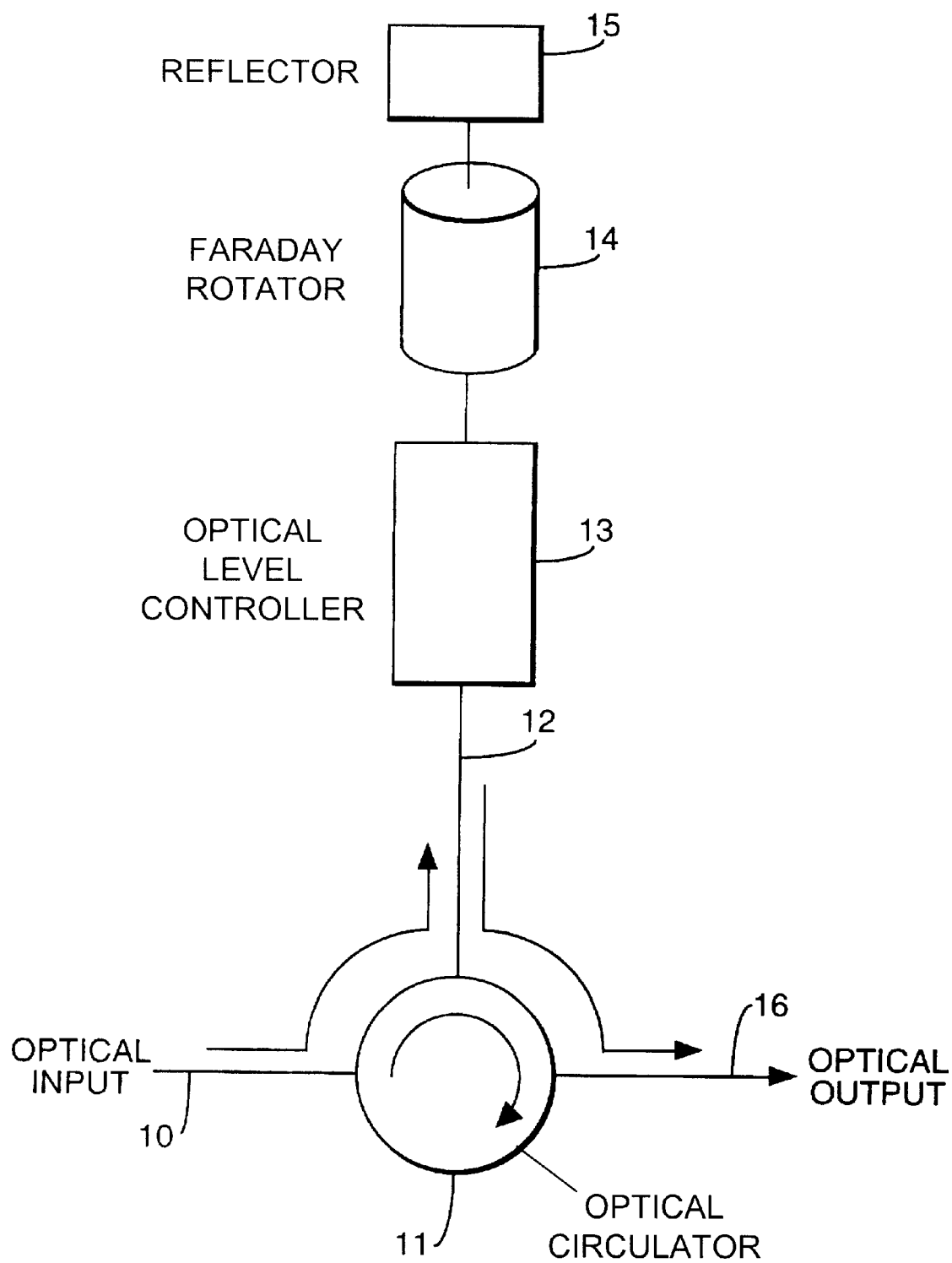
FIG. 3 shows a block diagram of an optical circuit which provides polarisation independence for the arrangement of FIG. 2.

FIG. 3 shows a block diagram of an optical system which overcomes this. A WDM optical signal 10 is coupled via an optical circulator 11 to an arm 12 which includes the optical level controller 13 of FIG. 2, a 45° degree Faraday rotator 14, and a reflector 15. The optical signal is reflected so that it makes a double pass along the arm 12 and subsequently appears at the output 16 of the optical circulator 11. The double pass through the Faraday rotator 14 causes the optical signal to adopt a predetermined state of polarisation for subsequent input to the optical level controller 13.

Although an optical circulator 11 is shown in the Figure, any suitable optical coupler may be used, for example a 3 dB optical coupler.

Figure 4:
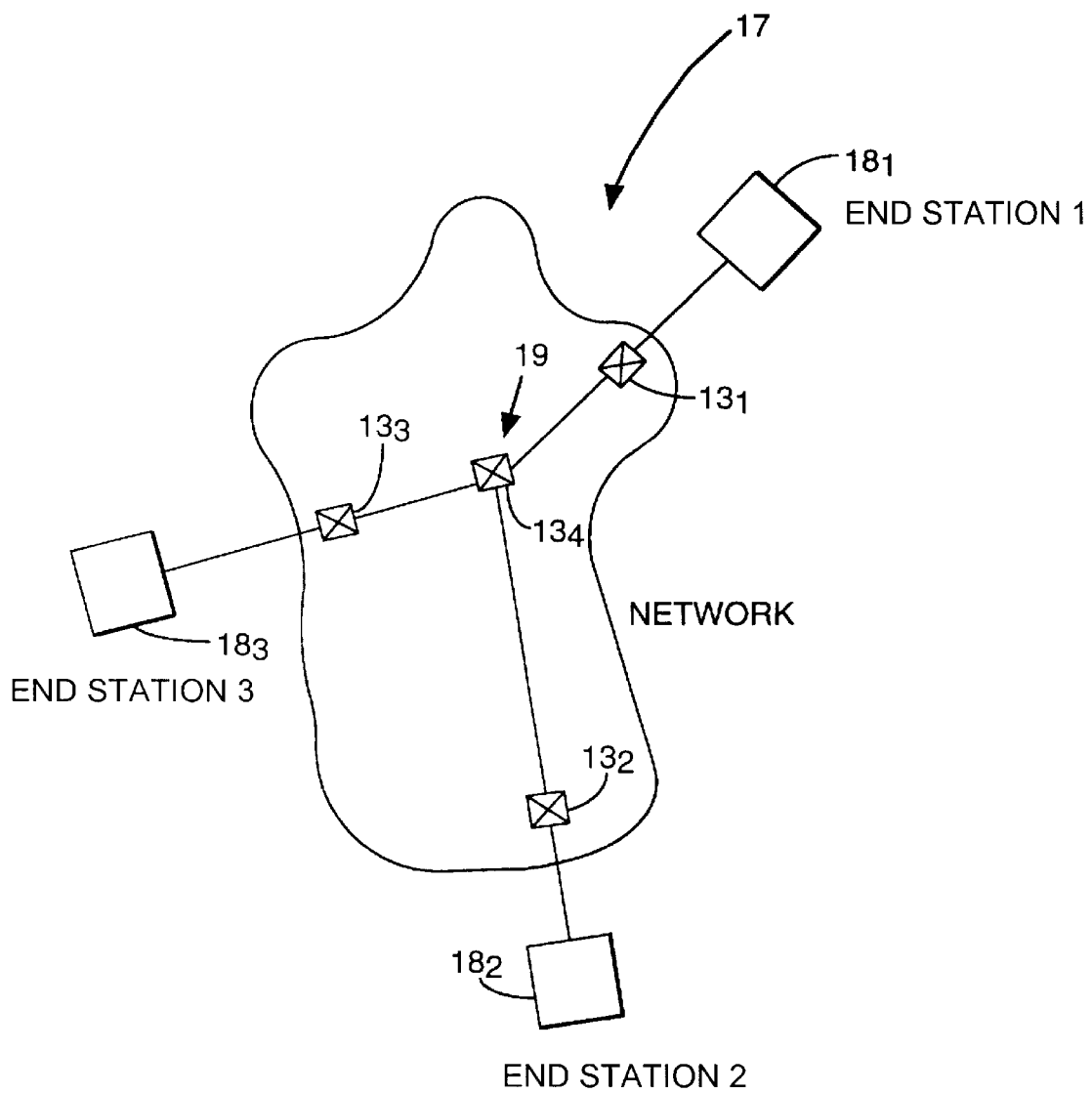
FIG. 4 shows an example of an optical communication network which includes an optical level controller in accordance with present invention.

FIG. 4 shows an optical communication network 17 which includes a number of endstations 18 connected to the network. Each endstation 18 includes an optical level controller 13 on a receiving line to protect against error bursts caused by fast power transients. An optical level controller 13 is also provided at an optical cross-connect 19 of the network.

What is claimed is:

1. A voltage level controller for a wavelength division multiplexed optical communication network, comprising:

one or more variable gain elements having optical input means; and, a negative feedback loop; wherein, said one or more variable gain elements include means for suppressing transient amplitude fluctuations in optical traffic signals input thereto, and said one or more variable gain elements are controlled through the negative feedback loop wherein the response time of the negative feedback loop is shorter than the time scale of the transient amplitude fluctuations.

2. An voltage level controller according to claim 1, in which the variable gain element is a semiconductor laser amplifier in which the bias of the amplifier is controlled by the negative feedback loop.

3. A voltage level controller according to claim 1, in which the variable gain element is a Mach-Zehnder optical modulator in which the bias of the modulator is controlled by the negative feedback loop.

4. A voltage level controller according to claim 3, further comprising means to present an optical signal at an input to the voltage level controller at a predetermined state of polarisation.

5. A voltage level controller according to claim 1, in which the negative feedback loop comprises an optical coupler to split a portion of the output of the respective variable gain element onto the negative feedback loop, and a photodiode to detect the split portion of the variable gain element.

6. A voltage level controller according to claim 1, in which the negative feedback loop comprises a low pass filter to provide a slowly varying dc voltage for control of the respective variable gain element.

7. A wavelength division multiplexed optical communication network comprising a voltage level controller, said voltage level controller comprising:

one or more variable gain elements having optical input means; and, a negative feedback loop; wherein, said one or more variable gain elements include means for suppressing transient amplitude fluctuations in optical traffic signals input thereto, and said one or more variable gain elements are controlled through the negative feedback loop wherein the response time of the negative feedback loop is shorter than the time scale of the transient amplitude fluctuations.

8. A communication network according to claim 7, in which the voltage level controller is arranged to condition signals entering a receiving station of the network.

9. A communication network according to claim 7, in which the voltage level controller is arranged at an optical cross-connect of the network.

10. A voltage level controller for a wavelength division multiplexed optical communication network, comprising:

one or more variable gain elements having optical input means; and, a negative feedback loop; wherein, said one or more variable gain elements include means for suppressing transient amplitude fluctuations in optical traffic signals input thereto, and said one or more variable gain elements are controlled through the negative feedback loop wherein the response time of the negative feedback loop is shorter than the time scale of the transient amplitude fluctuations, and said one or more variable gain elements comprises a Mach-Zehnder optical modulator in which the bias of the modulator is controlled by the negative feedback loop.

* * * * *